(12) United States Patent
McMahon

(10) Patent No.: US 7,544,404 B2
(45) Date of Patent: Jun. 9, 2009

(54) SHAPE-RECOVERING MATERIAL

(75) Inventor: Roy P. McMahon, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 1581 days.

(21) Appl. No.: 10/014,005

(22) Filed: Dec. 10, 2001

(65) Prior Publication Data

US 2003/0108707 A1 Jun. 12, 2003

(51) Int. Cl.
*B65D 53/00* (2006.01)
*F16B 4/00* (2006.01)

(52) U.S. Cl. .................. 428/34.9; 428/36.92; 428/35.1; 24/442

(58) Field of Classification Search ............... 428/36.9, 428/34.9, 35.1, 36.92; 24/442, 446, 451, 24/543, 703.1, 444, 450, 544
See application file for complete search history.

(56) References Cited

U.S. PATENT DOCUMENTS

| | | | |
|---|---|---|---|
| 3,009,235 A | | 11/1961 | de Mestral |
| 3,130,111 A | | 4/1964 | Izumi |
| 3,387,345 A | | 6/1968 | Savoir |
| 3,483,285 A | | 12/1969 | Foley |
| 3,684,755 A | | 8/1972 | Gumerman |
| 3,734,273 A | | 5/1973 | Watanabe |
| 3,867,931 A | * | 2/1975 | Babka .................. 602/9 |
| 3,957,382 A | | 5/1976 | Greuel, Jr. et al. |
| 4,064,296 A | | 12/1977 | Bornstein et al. |
| 4,608,284 A | | 8/1986 | Roales |
| 4,929,477 A | | 5/1990 | Will |
| 4,944,987 A | * | 7/1990 | Cordia et al. ............ 428/192 |
| 5,129,608 A | | 7/1992 | Goldman |
| 5,369,853 A | | 12/1994 | Okawa et al. |
| 5,579,575 A | * | 12/1996 | Lamome et al. ............ 29/860 |
| 5,752,926 A | * | 5/1998 | Larson et al. .............. 602/7 |
| 6,015,600 A | | 1/2000 | Greuel, Jr. et al. |
| 6,065,847 A | | 5/2000 | Palmer et al. |

(Continued)

FOREIGN PATENT DOCUMENTS

EP 0813277 12/1997

(Continued)

OTHER PUBLICATIONS

Japanese Office Action for Patent Application 2003-550964 and Partial Translation mailed Jul. 22, 2008.

(Continued)

*Primary Examiner*—Michael C Miggins
(74) *Attorney, Agent, or Firm*—Daly, Crowley, Mofford & Durkee, LLP

(57) ABSTRACT

A structure includes a hollow tubular first body made of a shape-recovering polymeric material having a first region in the recovered state, and a second region in the expanded state. A second body including an element of a fastener, such as a hook-and-loop fastener, is affixed to the first region of the first body with an adhesive joint. The first body is desirably in the form of a hollow tube that encloses a wire bundle or other enclosed body. The structure may also include a support, and a second element of the hook-and-loop fastener affixed to the support. The first element of the hook-and-loop fastener is engaged to the second element of the hook-and-loop fastener.

15 Claims, 6 Drawing Sheets

U.S. PATENT DOCUMENTS 6,245,174 B1 * 6/2001 Cordia et al. ............... 156/160
6,337,115 B1    1/2002 McMahon
6,716,382 B1 * 4/2004 McMahon ................. 264/230

FOREIGN PATENT DOCUMENTS

| GB | 1585 154 | * | 2/1981 |
| GB | 1585154 | | 2/1981 |
| JP | 60-59725 | | 4/1985 |
| JP | 62-190384 | | 12/1987 |
| JP | 2000-209753 | | 7/2000 |

OTHER PUBLICATIONS

Partial Translation of Document JP 62-190384.
Partial Translation of Document JP 2000-209753.
Partial Translation of Document JP 60-059725.

* cited by examiner

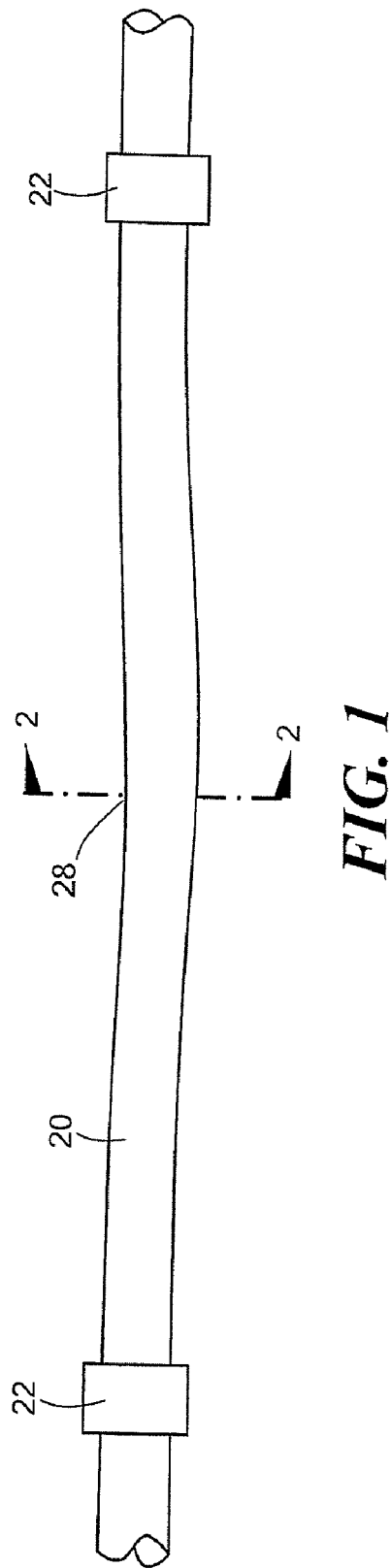
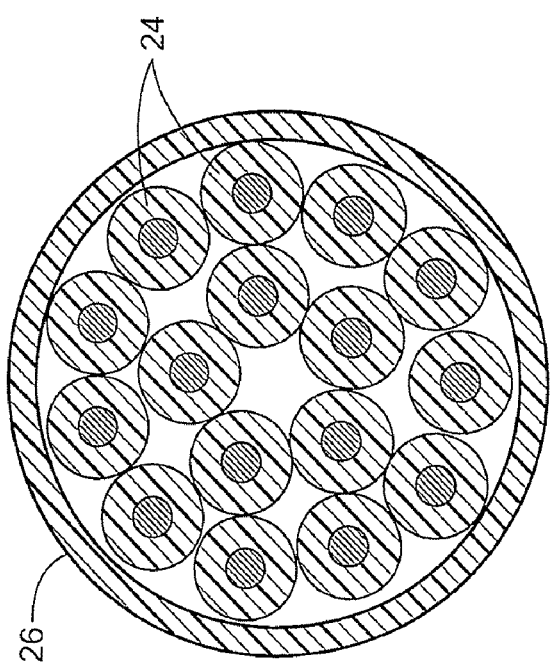

SHAPE-RECOVERING MATERIAL

This invention relates to shape-recovering material, especially in a tubular form, and, more particularly, to shape-recovering material suitable for use in fastening two articles together.

BACKGROUND OF THE INVENTION

Shape-recovering material, sometimes also called heat-shrinkable material, is widely used in marking and packaging applications. A working definition used herein is that the shape-recovering material is a polymer having materials properties described by a recovered state and an expanded state which contracts toward the recovered state upon heating. The structure and functionality of shape-recovering material are well known in the art for a number of applications, see for example, U.S. Pat. No. 6,015,600.

When the shape-recovering material is provided in tubular form, it is typically structured to contract to or toward a specified size in the recovered state. In its initial manufacturing, the shape-recovering material is extruded in a particular shape and size, expanded to the expanded state, and thereafter cooled so that the expanded state is retained. When it is to be applied in service, the expanded and cooled material is placed overlying a body to be enclosed, and then again heated so that it contracts back toward the recovered state, thereby enclosing the body in a polymeric covering.

In some applications, a tube of the shape-recovering material in the expanded state is placed over a wire bundle and thereafter heated to contract it to the recovered state. The enclosed wire bundle is supported from adjacent structure with appropriate clamps or fixtures spaced along its length. This arrangement is often used in aircraft wiring harnesses to hold the multiple wires in an orderly arrangement and facilitate their support from bulkheads and the like.

However, it is sometimes found in service that the intermediate portion of the enclosed wire bundle, positioned between the neighboring clamps or fixtures, flexes, rattles, vibrates, or swings freely, risking damage to the wire bundle or to the adjacent structure. It has been proposed to affix the enclosed wire bundle to the adjacent structure at intermediate locations using a fastener including an adhesive link. However, such a technique is not practical for many situations because it requires that the enclosed wire bundle be held in place until the adhesive cures, either manually by the wiring installer or with clamps that are difficult to apply.

There is a need for an approach for providing such a support that is secure, light in weight, and readily utilized. The present invention fulfills this need, and further provides related advantages.

SUMMARY OF THE INVENTION

The present invention provides a structure including a first body made in part of a shape-recovering material. The shape-recovering material is processed so as to facilitate attachment of a second body to the first body. The second body may include, for example, a portion of a fastener, a preprinted label, or the like. This structure facilitates the attachment of various articles to each other. In an application of interest, the first body is a tube of the shape-recovering material, and the second body includes a first element of a fastener such as a hook-and-loop fastener. The tube of the shape-recovering material is placed over an enclosed body, and the fastener is used to hold the enclosed body to adjacent structure. This approach is reliable and readily implemented in applications such as the attachment of aircraft or automotive wiring harnesses. The preferred application is in such attachment structures, but it will be appreciated that the present approach is more widely applicable to attach a second body to a piece of shape-recovering material.

In accordance with the invention, a structure comprises a first body made of a shape-recovering polymeric material having materials properties described by a recovered state and an expanded state which contracts toward the recovered state upon heating. Typically, the shape-recovering polymeric material has a contraction ratio between the expanded state and the recovered state of at least about 2:1, in many cases at least about 4:1, and normally from about 2:1 to about 6:1. Examples of the shape-recovering polymeric material include polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene. In one application, the first body is a hollow tube. The hollow tube overlies an enclosed body, such as a wire or a wire bundle.

The first body has a first region in the recovered state, and a second region in the expanded state. A second body is affixed to the first region of the first body, preferably by an adhesive joint. The second body may be a portion of a fastener. Desirably, the second body comprises at least a first element of a hook-and-loop fastener.

In one approach of interest, the second body comprises a first element of a hook-and-loop fastener. The structure further includes a support, and a second element of the hook-and-loop fastener affixed to the support. The first element of the hook-and-loop fastener is engaged to the second element of the hook-and-loop fastener. The first body is preferably a hollow tube overlying the enclosed body.

With this approach, the first body is fabricated as a hollow tube with the fastener element of the second body affixed with an adhesive to the first region of the hollow tube. This article, including the hollow tube and the fastener element, is fabricated prior to placing the hollow tube over the enclosed body. Thus, it may be fabricated on an assembly line and under controlled conditions to ensure good quality and reproducibility. When it is time for installation, the hollow tube is slipped over the enclosed article, and the second region heated to recover the second region and constrict the hollow tube snugly over the enclosed body. Meanwhile, the second element of the fastener, such as the hook-and-loop fastener, is affixed to the support by any convenient approach. The first element and the second element of the fastener are brought into contact to secure the two elements together, and thence secure the enclosed body to the support.

The shape-recovering material typically contracts from the expanded state to the recovered state by a linear ratio of 2:1 or more when heated. If the second body, which has a substantially constant linear dimension, were affixed to a portion of the first body prior to its being contracted to the recovered state (i.e., while in the expanded state), the contraction of the shape-recovering material during recovery would tend to debond the adhesive and cause the second body to separate from the first body. The constraint of the contraction of the first body would also distort the contraction and reduce the snugness of the fit of the first body on the enclosed body.

With the present approach, on the other hand, the first region is preshrunk to the recovered state. The second body is thereafter affixed, preferably by an adhesive layer, to the first region of the first body. There is very little or no further contraction of the first region when the first body is heated to contract the second region to the recovered state, so that the joint between the first region of the first body and the second body is not distorted. The result is that the second body is securely affixed to the first body in a controlled, reliable manner. As described, the second body is a fastener element in one preferred embodiment, but the second body may be any other item that is to be securely fastened to the shape-recovering material of the first body. Examples include preprinted labels or diagrams, and magnets. The first body is described as a wiring harness in the preferred embodiments, but it may be any object.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is an elevational view of a supported wiring harness;

FIG. 2 is a sectional view through the wiring harness of FIG. 1, taken on line 2-2;

DETAILED DESCRIPTION OF THE INVENTION

Figure 3:
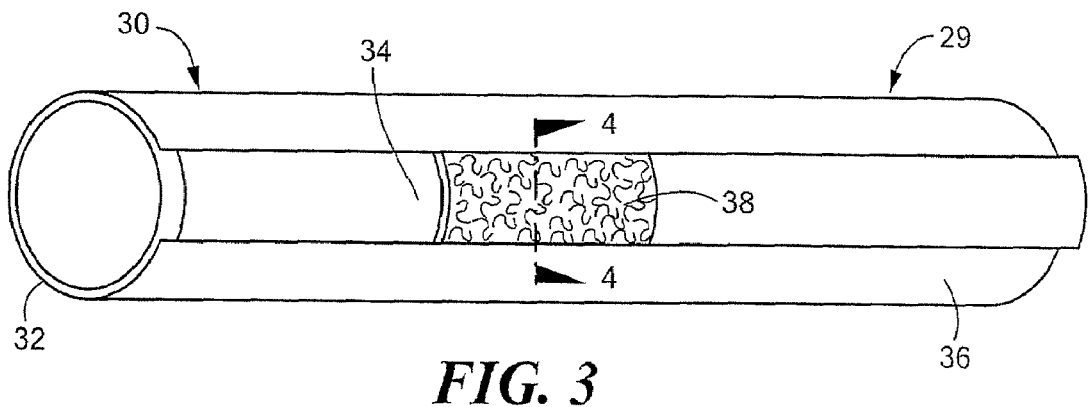
FIG. 3 is a perspective view of a structure according to the invention.

FIG. 1 depicts a conventional wiring harness 20 supported from clamps 22. FIG. 2 shows the construction of the wiring harness 20, having a bundle of electrical wires 24 (or other elongated wires or optical fibers) enclosed within a tube 26 of shape-recovering polymeric material. The shape-recovering polymeric material provides a convenient approach to holding the wires 24 in a tightly grouped, compact bundle that is easier to work with in wiring harness applications than a number of separate wires. The clamps 22 are spaced apart along the length of the wiring harness 20. At intermediate locations 28 of the wiring harness 20 between the clamps 22, the wiring harness 20 may rattle, vibrate, or swing about in a manner that may cause damage to the wiring harness itself or to adjacent objects. A preferred application of the present invention reduces the incidence of such potential damage.

FIG. 3 illustrates an attachment structure 29 including first body 30, preferably in the form of a hollow tube 32. The hollow tube 32 is made of a shape-recovering polymeric material having materials properties described by a recovered state and an expanded state which contracts toward the recovered state upon heating. Such shape-recovering materials are known in the art and are described, for example, in U.S. Pat. No. 6,015,600 and MILSPEC MIL-DTL-23053, whose disclosures are incorporated by reference. Such polymeric materials are well known in the art for other applications, but not for the present application, and are sometimes called "heat-shrinkable tubing" or "shrink tubing". Examples of operable materials include polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene, but use of the invention is not limited to these materials. The present invention is operable with all such shape-recovering polymeric materials.

The first body 30 has a first region 34 with the shape-recovering polymeric material in the recovered state, and a second region 36 with the shape-recovering polymeric material in the expanded state.

Figure 4:
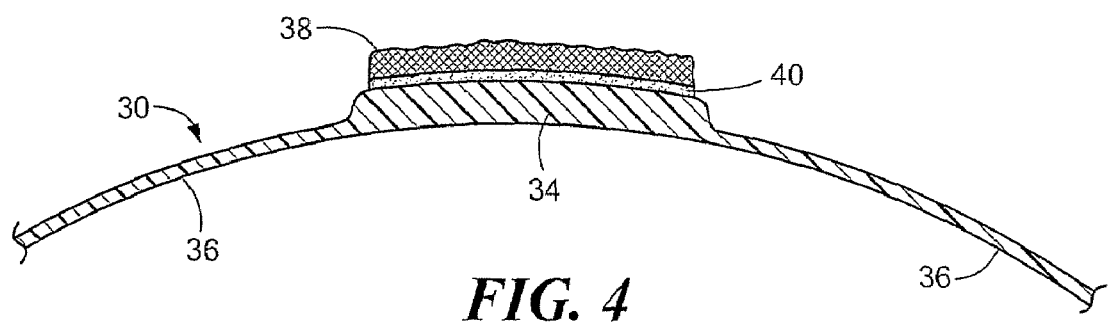
FIG. 4 is a sectional view of the structure of FIG. 3, taken on line 4-4.
Figure 5:
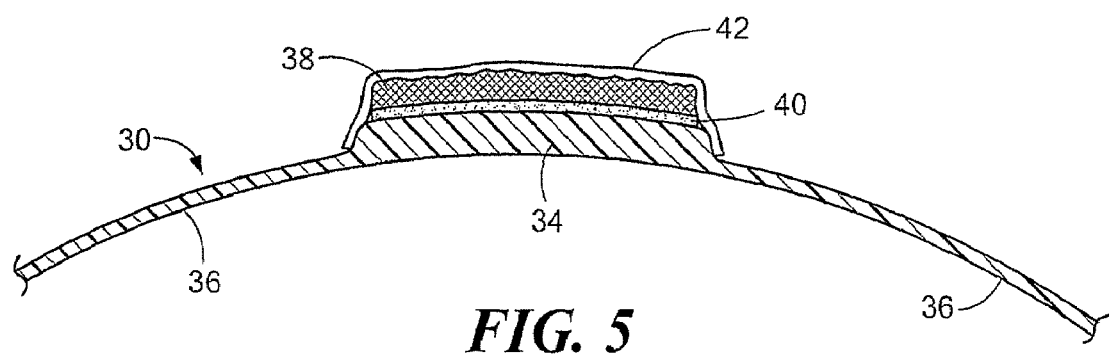
FIG. 5 is a sectional view of a second embodiment of the structure of FIG. 3.

A second body 38 is affixed to the first region 34 of the first body 30. The second body 38 may be shorter in length than the first region 34, as illustrated, or it may be of the same length as the first region 34. The affixing is accomplished by any operable approach. FIG. 4 illustrates the preferred manner of affixing the second body 38 to the first region 34 of the first body 30. An adhesive layer forms a joint 40 between the second body 38 and the first region 34 of the first body 30. FIG. 5 is another embodiment of this approach, wherein a heat shield 42 in the form of a thin piece of foil or aluminized plastic is removably positioned over the second body for reasons to be discussed subsequently.

The second body 38 preferably comprises at least one part of a fastener, and most preferably comprises an element of a hook-and-loop fastener. "Hook-and-loop fasteners" are known in the art and are described, for example in U.S. Pat. Nos. 3,009,235; 3,130,111; 3,387,345; and 5,369,853 Hook-and-loop fasteners are often commonly known by their trademarked name Velcro™. The hook-and-loop fastener includes two elements, the "hook" element and the "loop" element. When contacted together these two elements engage each other to provide a temporary attachment between the two elements, and thence between any objects to which they are attached.

Figure 6:
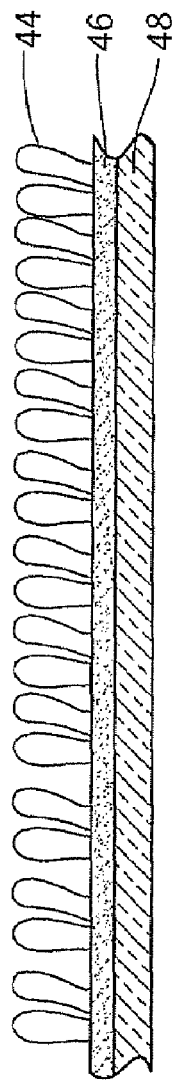
FIG. 6 is an elevational view of a second element of the fastener.

For attachment applications, there may be provided a second fastener element initially separate from the first body 30. FIG. 6 depicts a second element 44 as the second element of the hook-and-loop fastener. The second element 44 is conveniently provided with means for attaching it to a support. In the embodiment of FIG. 6, the second element 44 has an adhesive layer 46 of a suitable adhesive, such as a pressure-sensitive adhesive or a more-permanent adhesive, applied to a back side of the second element 44 remote from the hook or loop structure. A peel-off backing 48 overlies the adhesive layer 46. To apply the second element 44 to a support, the peel-off backing 48 is removed and the adhesive layer 46 is pressed against the support with the second element 44 facing outwardly.

Figure 7:
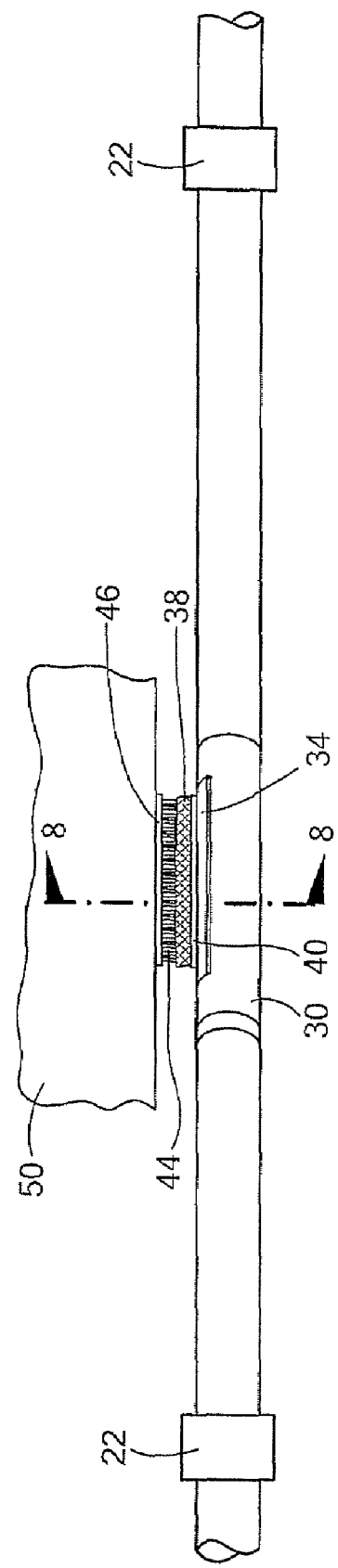
FIG. 7 is an elevational view of a supported wiring harness according to the invention.
Figure 8:
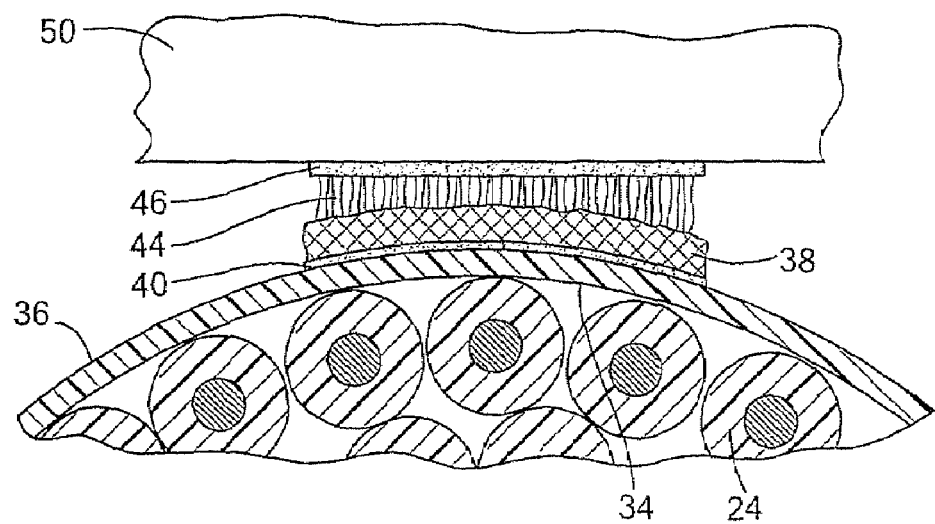
FIG. 8 is a sectional view of the wiring harness of FIG. 7, taken on line 8-8.

FIG. 7 illustrates the manner of attaching the wiring harness 20 to a support 50 at a location between the clamps 22, thereby reducing the tendency of the wiring harness 20 to flex, rattle, vibrate, or swing freely. FIG. 8 is a sectional view through the attached structure. The hollow tube 32 of the first body 30, with the second body 38 affixed to the first region 34 of the first body 30, is slipped over the wiring harness 20. The hollow tube 32 may be a portion of the length of the tube 26 shown in FIG. 2 (as in FIG. 8), or it may be a separate hollow tube that is slipped over the tube 26 (as in FIG. 9). The second element 44 is affixed to the support 50 by any operable approach, such as that discussed above in relation to FIG. 6. The second body 38, which in this case is either the hook element or the loop element of the hook-and-loop fastener, is engaged to the second element 44, which is the other element of the hook-and-loop fastener.

Figure 9:
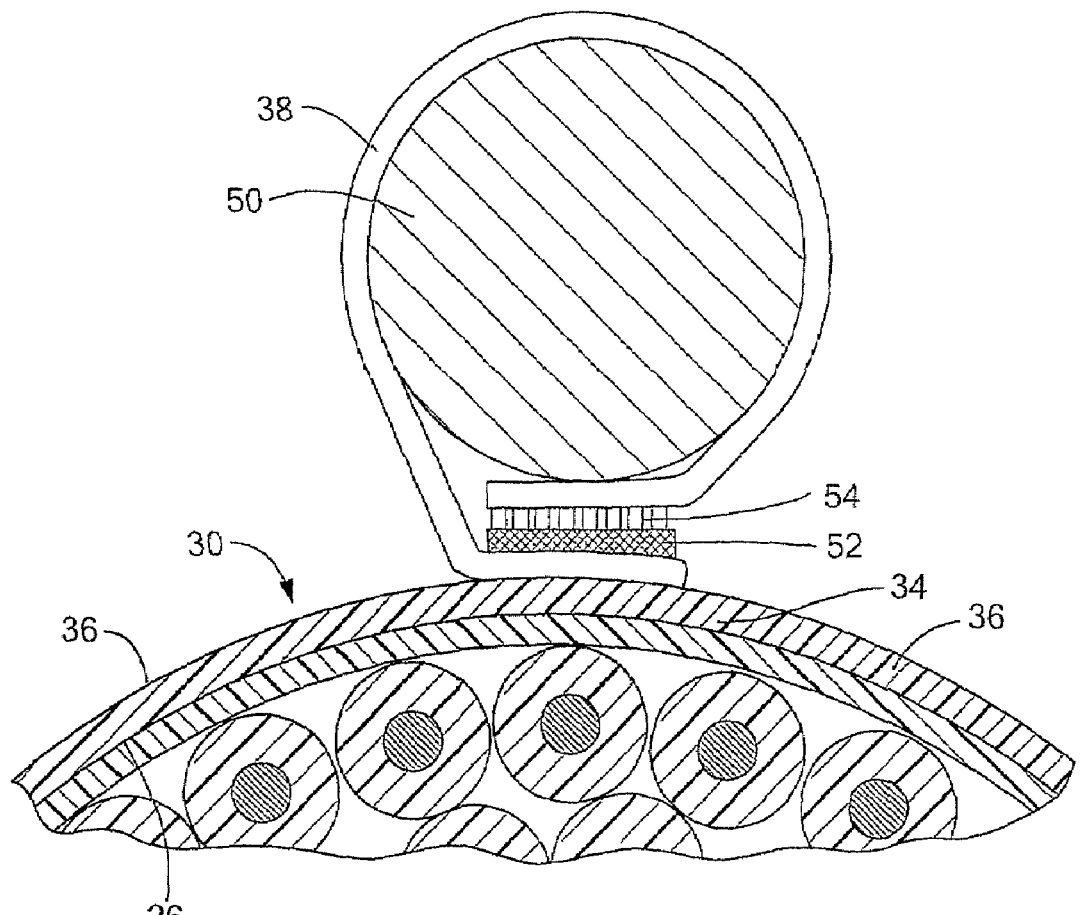
FIG. 9 is a schematic sectional view of another embodiment of the attachment structure.

The second body 38 may take any operable form. An embodiment shown in FIG. 9 is suitable for use when the support 50 is a pipe, strut, or other structure wherein the second body 38 may be wrapped around or threaded through the support 50. The second body 38 is an elongated strip of flexible material such as a fabric or a flexible polymer. The first element of the hook-and-loop fastener is a first patch 52 applied to the second body 38. The second element of the hook-and-loop fastener is a second patch 54 applied to a different area of the second body 38. The patches 52 and 54 are positioned so that they are in a facing relationship when the second body 38 is wrapped around the support 50. Optionally, the second body 38 may be made of a shape-recovering polymeric material like that discussed above, initially in the expanded state, so that upon heating the second body 38 contracts to the recovered state to draw the first body 30 tightly against the support 50. In the embodiment of FIG. 9, the first body 30 is slipped over the tube 26, so that they are separate elements.

Figure 10:
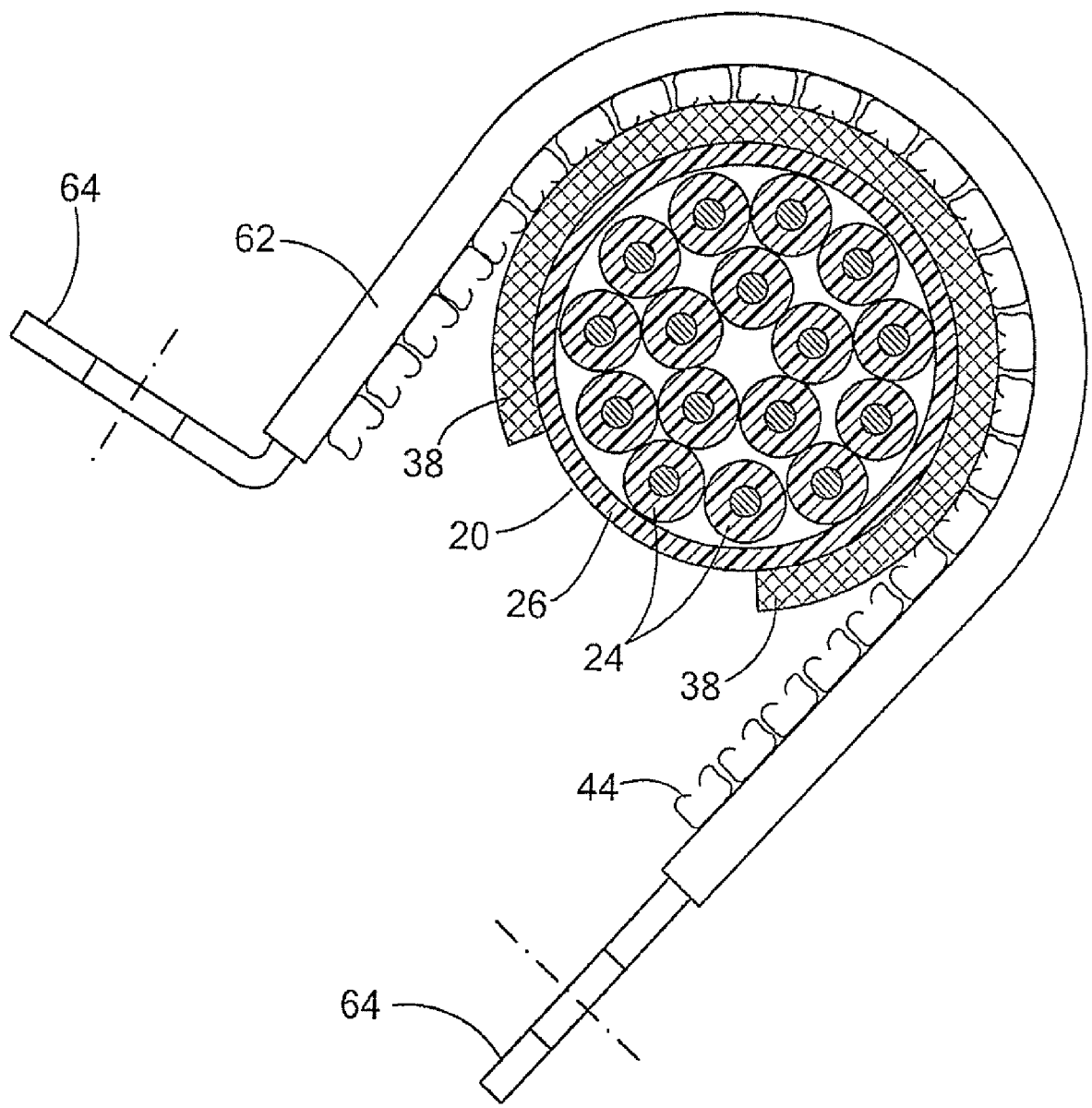
FIG. 10 is a schematic sectional view, with the elements separated for clarity of illustration, of yet another embodiment of the attachment structure.

FIG. 10 depicts another embodiment wherein the wiring harness 20 is held within a "P"-clamp 60 comprising an annular rubber clamp body 62 and a metallic clamp attachment 64 extending from the clamp body 62. P-clamps 60 are known in the art, except for the improvements discussed herein. The clamp 22 of FIG. 1 could be such a P-clamp 60, for example. One problem with the use of conventional P-clamps for holding wiring harnesses is that the ability of the clamp to hold the harness in the correct lengthwise position is determined by how tightly the clamp attachments 64 are forced together. If insufficient clamping pressure is used, the wiring harness can slide lengthwise (perpendicular to the plane of the illustration of FIG. 10, which is the direction extending between the clamps 22 in FIG. 1). If too much clamping pressure is used, the wiring harness may be damaged. The present approach avoids these problems.

In the illustration of FIG. 10, elements common to the preceding description are given the same numbering here, and the prior description is incorporated here. The wiring harness 20 has the second body 38 exteriorly attached, as previously described. The clamp body 62 has the second element 44 attached to its inner periphery. The second body 38 is preferably one element of the hook-and-loop fastener, and the second element 44 is preferably the other element of the hook-and-loop fastener. The second body 38 and the second element 44 have been separated slightly from each other for clarity of illustration, but would be engaged to each other in practice. This arrangement allows the wiring harness 20 to be securely affixed to the clamp 60 at a selected location along the length of the wiring harness 20 without excessive tightening of the clamp 60 and without the wiring harness 20 slipping lengthwise through the clamp body 62.

The preferred embodiments described herein provide for an attachment structure, but the present approach is not so limited. Any other objects of interest may be attached as the second body 38 to the first body 30 by the present approach. Examples include preprinted labels or drawings, magnets, and the like. In each case, if the second body 38 were attached to the shape-recovering polymeric material prior to its being recovered, it would tend to debond from the first body and pop off. The present approach avoids such a result.

Figure 11:
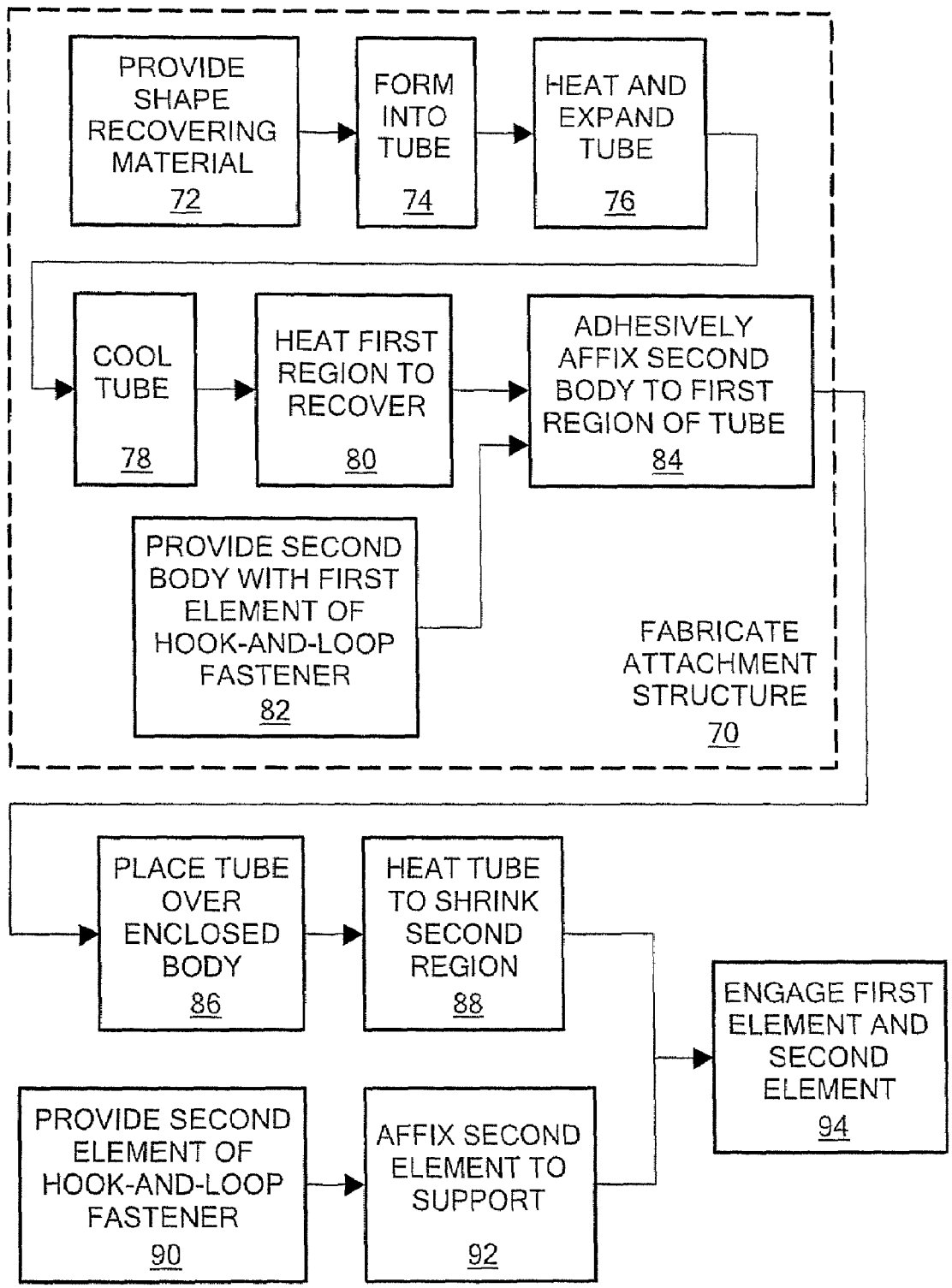
FIG. 11 is a block flow diagram of a method for practicing the invention.

FIG. 11 depicts a preferred method for practicing the invention, and similar approaches are used for other embodiments. The attachment structure 29 of FIG. 3 is first fabricated, numeral 70. The shape-recovering material described above is provided, numeral 72, and formed into a tube or other operable shape, numeral 74. The forming step 74 is preferably accomplished by extrusion.

The tube is heated to the temperature at which it is normally expanded for the selected material of the tube, and circumferentially expanded to stretch the material of the tube to its expanded state, numeral 76. The expansion is preferably performed by internal air pressure within the tube, and results in uniform circumferential expansion of the tube. Equivalently, the shape-recovering material may be expanded by other mechanical techniques. The tube is cooled to room temperature, numeral 78, while the internal pressure is maintained, "freezing in" the expanded state of the expanded tube. The first region 34, but not the second region 36, is thereafter heated, for example by passing a heated shoe along the length of the tube, to cause the first region 34 to contract and shrink back to the recovered state, numeral 80. The second region 36 is not heated, and is left in its expanded state. The recovery of the first region 34 leaves it with a significantly larger wall thickness than the second region 36, so that the first region 34 may be easily recognized visually.

The second body 38 is provided, numeral 82. The second body 38 preferably comprises one of the elements of the hook-and-loop fastener. The second body 38 is adhesively affixed to the first region 34 of the first body 30, numeral 84, to complete the fabrication of the attachment structure 29.

The hollow tube 32 of the attachment structure 29 is thereafter slipped over the body to be enclosed and attached, numeral 86, in this case directly over the wire or wires 24, or over a preexisting wiring harness 20 and its tube 26. The second region 36 of the first body 30 is thereafter heated, numeral 88, to cause it to contact to the recovered state and snugly enclose the enclosed body. It is typically not possible in a production setting to heat only the first region 36, and usually there is some heating of the second region 34 at the same time. The heat shield 42, shown in FIG. 5, may be provided to prevent overheating of the second body 38 and particularly the element of the hook-and-loop structure that is found on the second body 38, to a temperature above its maximum allowable temperature. After the heating 88 is complete, the heat shield 42 is stripped away to expose the protected element of the hook-and-loop structure.

Meanwhile, the second element 44 is provided, numeral 90, and affixed to the support 50 in the manner discussed previously, numeral 92. The first element and the second element of the hook-and-loop fastener structure are engaged to each other to complete the attachment of the enclosed body to the support, numeral 94.

In the method depicted in FIG. 11, the order of the steps 86, 88, 90, 92, and 94 may be altered in any operable manner. For example, the first and second elements of the hook-and-loop fastener may be engaged to each other (step 94) before the second element 44 is affixed to the support 50 (step 92). The heating 88 may be performed after these steps are completed, so that the shrinking of the first body 30 over the enclosed body may be completed as the last step. Many other variations are possible to accommodate particular circumstances. The only critical ordering of the steps is that the second body 38 must be affixed to the preshrunk first region 34 of the first body 30.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A structure comprising
a first body made of a shape-recovering polymeric material having materials properties described by a recovered state and an expanded state which contracts toward the recovered state upon heating, the first body having
a first region in the recovered state, and
a second region in the expanded state;
a second body affixed to the first region of the first body, wherein the second body is a first element of a fastener;
a support; and
a second element of the fastener affixed to the support, wherein the first element of the fastener and the second element of the fastener are engageable to each other to provide a releasable attachment between the two elements.

2. The structure of claim 1, wherein the second body comprises at least a first element of a hook-and-loop fastener.

3. The structure of claim 1, further including an adhesive joint between the second body and the first region of the first body.

4. The structure of claim 1, wherein the first body is made of a material selected from the group consisting of a polyolefin, polyvinylidene fluoride, polychloroprene, polyvinyl chloride, polyethylene terephthalate, silicone rubber, polytetrafluoroethylene, fluorinated ethylene propylene, and ethylene-tetrafluoroethylene.

5. The structure of claim 1, wherein the first body is a hollow tube overlying an enclosed body, wherein the second body comprises a first element of a hook-and-loop fastener, and wherein the second element of the fastener is a second element of the hook-and-loop fastener.

6. The structure of claim 1, wherein the first body is a hollow tube.

7. The structure of claim 6, wherein the hollow tube overlies an enclosed body.

8. The structure of claim 6, wherein the hollow tube overlies a wiring harness comprising a bundle of electrical wires, other elongated wires, or optical fibers.

9. The structure of claim 6, wherein the hollow tube overlies a bundle of wires comprising at least two wires.

10. A structure comprising
a first body comprising a hollow tube made of a shape-recovering polymeric material having materials properties described by a recovered state and an expanded state which contracts toward the recovered state upon heating, the first body having
a first region in the recovered state, and
a second region in the expanded state;
a second body affixed to the first region of the first body, wherein the second body comprises an element of a hook-and-loop fastener; and
an adhesive joint between the second body and the first region of the first body.

11. The structure of claim 10, wherein the second body comprises a first element of a hook-and-loop fastener, and wherein the structure further includes
a support, and
a second element of the hook-and-loop fastener affixed to the support, and wherein the first element of the hook-and-loop fastener is engaged to the second element of the hook-and-loop fastener.

12. The structure of claim 10, wherein the hollow tube overlies an enclosed body.

13. The structure of claim 10, wherein the hollow tube overlies a wiring harness comprising a bundle of electrical wires, other elongated wires, or optical fibers.

14. The structure of claim 10, wherein the hollow tube overlies a bundle of wires comprising at least two wires.

15. The structure of claim 10, wherein the shape-recovering polymeric material has a contraction ratio of at least about 2:1.

* * * * *

UNITED STATES PATENT AND TRADEMARK OFFICE
CERTIFICATE OF CORRECTION

PATENT NO.      : 7,544,404 B2                              Page 1 of 1
APPLICATION NO. : 10/014005
DATED           : June 9, 2009
INVENTOR(S)     : McMahon It is certified that error appears in the above-identified patent and that said Letters Patent is hereby corrected as shown below:

In the Specifications

Column 1, line 13 delete "materials" and replace with --material--.

Column 2, line 8, delete "materials" and replace with --material--.

Column 3, line 63, delete "materials" and replace with --material--.

Column 5, line 40, delete "here," and replace with --herein,--.

Column 6, line 32, delete "contact" and replace with --contract--.

In the Claims

Column 7, line 2, Claim 1, delete "comprising" and replace with --comprising:--.

Column 7, line 4, Claim 1, delete "materials properties" and replace with --material properties--.

Column 7, line 6, Claim 1, delete "having" and replace with --having:--.

Column 8, line 6, Claim 10, delete "comprising" and replace with --comprising:--.

Column 8, line 8-9, Claim 10, delete "materials properties" and replace with --material properties--.

Column 8, line 11, Claim 10, delete "having" and replace with --having:--.

Column 8, line 21, Claim 11, delete "includes" and replace with --includes:--.

Signed and Sealed this
Twenty-fifth Day of March, 2014

Michelle K. Lee
*Deputy Director of the United States Patent and Trademark Office*